United States Patent Office 3,502,478
Patented Mar. 24, 1970

3,502,478
RUMINANT FEED
Eugene S. Erwin, Tolleson, Ariz., assignor to Monsanto Company, St. Louis, Mo., a corporation of Delaware
No Drawing. Continuation-in-part of application Ser. No. 167,953, Jan. 22, 1962. This application Dec. 20, 1965, Ser. No. 515,153
Int. Cl. A23k 1/00; C07c 127/00
U.S. Cl. 99—2                                   5 Claims

ABSTRACT OF THE DISCLOSURE

An adduct of urea and a hydrocarbon of about 6 to about 26 carbon atoms in a straight chain provide a source of non-protein nitrogen for ruminants which is more effective and efficient than the use of urea alone.

---

This application is a continuation-in-part of application Ser. No. 167,953, filed Jan. 22, 1962, by Eugene S. Erwin, now abandoned.

This invention relates to animal feeds and more specifically to feeds useful in raising ruminant animals. The invention provides a means of improving feeds and reducing the cost of a high nitrogen feed.

It is well known that urea can be used in animal feeds and particularly for feeding ruminant animals, such as cattle, sheep and goats. However, the use of a substantial amount of urea seriously affects the palatability of the feed. Animals will usually refuse a feed in which a significant quantity of urea is present, because of the bitterness imparted by the urea. Furthermore, urea is deliquescent and readily absorbs moisture from the atmosphere to form moist feed components. This causes the urea to become adhesive thereby impeding the thorough mixing with other feed components which is necessary to reduce local concentrations of urea and its incidental bitterness.

In accordance with the present invention it has been found that urea hydrocarbon adducts provide nutrient values superior to urea but without the disadvantages incident to the use of urea. The adducts are free flowing solids which can be readily mixed with other feed components. Unlike urea the hydrocarbon adducts do not affect the palatability of the feeds. The bitter taste of urea is greatly reduced or entirely eliminated and the animals take the feed readily. Thus, the practice of the invention enables the feeding of the urea-nitrogen to animals at levels not previously possible.

Useful hydrocarbons are straight or substantially straight chained hydrocarbons with about 6 to about 26 carbon atoms in the chain. They may be the alkanes such as n-hexane, n-octane, n-decane, n-dodecane, n-tetradecane, n-octadecane, 8-methyldodecane, eicosane, etc. or the olefins, such as n-hexene, n-octene, n-dodecene, n-decene, n-octadecene, 2-methyl-n-octadecene, eicosene and other substantially straight chain olefins which are non-toxic to ruminant animals.

PREPARATION OF ADDUCTS

A four liter Erlenmeyer flask was charged with 2 liters of absolute ethanol and 450 grams of urea added thereto. The mixture was refluxed until a clear solution was obtained. The solution was then charged with 600 grams of 1-tetradecene and refluxed for 10 minutes. The reaction mixture was cooled and filtered. The salt so obtained was dried and screened to uniform particle size. The product was found to be a urea hydrocarbon inclusion compound. By the same procedure an adduct of urea and n-tetradecane was formed.

PREPARATION OF FEEDS

The following basal feed was used in feeding uniform sized lambs (55 lbs.):

|  | Percent |
|---|---|
| Cottonseed hulls | 30.0 |
| Cracked corn | 29.0 |
| Rolled barley | 29.0 |
| Molasses | 8.8 |
| $CaCO_3$ | 1.2 |
| Dicalcium phosphate (18% P) | 0.8 |
| $MgSO_4$ | 0.2 |
| $Na_2SO_4$ | 0.6 |
| Salt | 0.3 |

The adducts were formulated into the feed by first mixing with starch as follows:

| | | Mixture | |
|---|---|---|---|
| Urea Adduct of— | Percent N | Kg. Adduct | Kg. Starch |
| n-Tetradecane | 34.6 | 5.58 | 0.549 |
| 1-tetradecene | 32.0 | 6.03 | 0.096 |

Metabolism studies were conducted to determine the nitrogen balance and to measure the weight and percent of nitrogen retained. For purposes of comparison control experiments were run using urea in place of the urea hydrocarbon adducts. The following observations were made:

| | N retained, gms. per day | Percent N retained |
|---|---|---|
| Urea (control) | 1.73 | 14.5 |
| n-Tetradecane urea adduct | 2.16 | 19.3 |
| 1-tetradecene urea adduct | 2.22 | 19.1 |

These data show that the urea adducts of the hydrocarbon provide a source of non-protein nitrogen for the ruminant animal which is more effective and efficient than the use of urea and far beyond what is possible by direct addition of urea to feeds.

The animal feed may be comprised entirely of the urea adduct wherein the urea moiety will provide the nitrogen requirements and the hydrocarbon moiety will provide the essential energy content. Preferred feeds are those of high energy content and will contain at least one other conventional nutrient feed component.

A conventional component in ruminant feeds is the cellulosic roughage component. By the expression "cellulosic roughage," it is intended to refer to any nutrient component which contains at least 5% fiber. The fiber is principally cellulose which may also contain lignin chemically bound thereto. Typical fiber containing feeds include hay, straw, cottonseed hulls, cotton mill wastes, beet pulp, silage, ground corn cobs, corn stalks, oats, barley, cereal brans, and cereal middlings. One or more of these cellulosic roughage components is essential in balanced ruminant feeds and at least 2% by weight is included and as much as 60% or more may be used. However, in some areas cattle are fed with diets consisting entirely of barley and/or oats or substantially entirely of these high fiber cereals.

In the preparation of ruminant feeds at least one cellulosic roughage component is used and this component is preferably present in excess of 2% by weight although it may greatly exceed this preferred minimum content. These are components conventional in all ruminant feeds, which are desirable because of their high fiber content and because the ruminant animal has the ability to digest such cellulosic components.

The ruminant feeds may contain natural oils including animal fats, such as beef tallow, mutton tallow; fish oils including eel, herring, menhaden, tuna and salmon oil, and whale oil. The vegetable oils are like fish oils of high unsaturated acid content and are therefore generally liquid, for example soybean oil, sunflower oil, olive oil, safflower oil, corn oil, peanut oil, cottonseed oil, rice oil, millet oil, wheat germ oil and palm oil. The liquid oils are preferred because of the ease of mixing with the other feed components.

An optional component of the animal feeds is a non-toxic antioxidant, such as 6-ethoxy-2,2,4-trimethyl-1,2-dihydroquinoline. These substances tend to preserve vitamins and the unsaturation in oils by preventing the oxidation which normally occurs during the preparation, storage and use of the animal feeds. In the feed composition the use of from 0.001 to 0.1% by weight of the non-toxic antioxidant has been found to enable the stabilization of the unsaturation and to preserve the nutrient value of the feed during preparation, storage and use of the ruminant feed. Preferred usage involves the addition of from 0.005 to 0.05% of the non-toxic antioxidants.

Complete balanced feeds may also contain in addition to cellulosic roughage, other components, for example minerals, such as bone meal, salt and the various trace minerals including salts of zinc, copper, manganese, magnesium, cobalt, iodine and iron. Antibiotics, steroids, anthelmintics and other medicants may be used. Various vitamins, particularly A, B, E and D complex, may be added to satisfy deficiencies in these vitamins incident to the selection of the various components of the complete feed. Diethyl stilbestrol is another optional component. Other basic nutrients such as casein and other milk by-products, may be used if desired or if they are necessary to satisfy the requirements of a complete feed. The various physical operations of mixing, grinding and packaging are well known to one skilled in the art.

Although the benefits of the invention are described with respect to specific examples, it is not intended that the details thereof should be limitative except to the extent that they are incorporated in the following claims.

What is claimed is:

1. A ruminant feed comprising at least about 2 percent by weight of a cellulosic roughage component and a crystalline adduct of urea and a hydrocarbon of about 6 to about 22 carbon atoms in a straight chain, said hydrocarbon being selected from the class consisting of alkanes and olefins.

2. A feed in accordance with claim 1 wherein the hydrocarbon is an alkane.

3. A feed in accordance with claim 1 wherein the hydrocarbon is an olefin.

4. A feed in accordance with claim 1 wherein the hydrocarbon is n-tetradecane.

5. A feed in accordance with claim 1 wherein the hydrocarbon is 1-tetradecene.

References Cited

UNITED STATES PATENTS 2,875,060  2/1959  Holman _____ 99—2

OTHER REFERENCES

McAdie: "The Thermal Decomposition of Urea-n-Paraffin Molecular Complexes," Am. Chem. Soc., Proceedings of Meetings (138), 1960, p. 37(s).

MAURICE W. GREENSTEIN, Primary Examiner

U.S. Cl. X.R.

260—96.5; 424—322